United States Patent [19]

Kazlauskas

[11] Patent Number: 4,726,300
[45] Date of Patent: Feb. 23, 1988

[54] ADJUSTABLE SPRING-BIASED TRACK ASSEMBLY FOR MOUNTING A WELDING HEAD ASSEMBLY ON A PIPE

[76] Inventor: Gasparas Kazlauskas, 10941 LaTuna Canyon, Sun Valley, Calif. 91352

[21] Appl. No.: 830,465

[22] Filed: Feb. 18, 1986

[51] Int. Cl.⁴ ............................................. E01B 25/08
[52] U.S. Cl. ...................... 104/118; 228/29; 219/60 A
[58] Field of Search ............. 104/118, 119; 105/29 R; 228/29, 32; 266/56, 67; 29/281.6; 219/60 R, 60 A, 124.1, 124.22, 124.31, 125.1; 73/761

[56] References Cited

U.S. PATENT DOCUMENTS

| | | | |
|---|---|---|---|
| 3,084,244 | 4/1963 | Rieppel et al. | 219/60 A |
| 3,851,386 | 12/1974 | Ellzey, Jr. | 73/761 X |
| 3,910,480 | 10/1975 | Thatcher | 228/29 X |
| 4,250,813 | 2/1981 | Slavens et al. | 104/118 |

Primary Examiner—Robert B. Reeves
Assistant Examiner—John Pido
Attorney, Agent, or Firm—Jack C. Munro

[57] ABSTRACT

A track assembly for mounting a welding head assembly onto a pipe for the purpose of welding the pipe. The track assembly includes a flexible annular base which is to be located about the pipe in close proximity to the exterior surface of the pipe but spaced therefrom. Located between the annular base and the pipe are a plurality of spaced-apart foot pad assemblies. Each foot pad assembly includes a pair of contact pads which function to exert a continuous spring force between the annular base and the pipe. Each contact pad is connected to a separate spring assembly which can be mutually adjusted to vary the amount of spring force between the flexible annular base and the pipe. Mounted on the exterior surface of the annular base is a track which is to connect with the welding head assembly upon which the welding head operates to move circumferentially about the pipe. A latching assembly in the form of an over-center latching mechanism is used to secure together the free ends of the annular base.

5 Claims, 7 Drawing Figures

ADJUSTABLE SPRING-BIASED TRACK ASSEMBLY FOR MOUNTING A WELDING HEAD ASSEMBLY ON A PIPE

BACKGROUND OF THE INVENTION

The field of this invention relates to welding of separate metallic cylindrical pipes and more particularly to a supporting apparatus for the welding head to cause the welding head to move about the pipe to produce the desired weld.

It has long been known to use various types of welding head supporting devices for the welding of pipes of various diameters. Generally each welding head supporting structure is designed for a specific diameter of pipe. Welding of one section of pipe to another section of pipe is normally performed repetitively. Therefore, it is frequently common to construct a welding head supporting assembly for a specific diameter of pipe. Each welding head supporting assembly is designed not to accommodate various pipe diameters.

The reason that welding head supporting structures have been designed for specific diameters of pipes is that the welding head must be rigidly mounted with respect to the pipe. Any minor amount of movement between the welding head supporting structure and the pipe will frequently result in the producing of an inferior weld. Also, it is generally desirable to have the welding head supporting structure to be continuous with no gaps. The welding head supporting assembly must be frequently movable from one pipe to another pipe and when installed on the new pipe, the break area of the welding head supporting assembly should be completely closed and again rigidly mounted onto the new pipe.

However, pipes of a given diameter vary slightly in diameter. In a larger diameter pipe, this variation can become substantial. Therefore, some structure must be utilized within the welding head supporting assembly to compensate for this pipe diameter variation.

In the past, it has been common to utilize a flexible band in conjunction with the welding head supporting assembly with this band to be mounted about the pipe to be welded. In the past, in order to compensate slightly for variations in pipe diameters, it has been known to have the ends of the band not quite meet, but have a slight gap therebetween. By increasing or decreasing the size of this gap, this band can then be utilized to accommodate slight variances in pipe diameters. However, when the welding head is moved across this gap area, there may result a momentary hesitation in the welding head, or a momentary increase in speed. This hesitation or increase in speed may result in the production of an inferior weld. It is well-known that only one small inferior spot of a weld that is several feet long will result in the production of an inferior weld.

Also, in the past, there has been utilized a spring-biased foot pad assembly between the band and the pipe. These spring-biased foot pads are for the purpose of compensating for slight variation in pipe diameter. Although these foot pad assemblies do work satisfactory with small variations in pipe diameter, it has been found that extreme variations in pipe diameter cannot be compensated for with the spring-biased foot pad assemblies used in the past.

SUMMARY OF THE INVENTION

The structure of the present invention is designed to be circumferentially mounted onto a metallic pipe in a tight fitting manner. The structure of the present invention has particular utility in conjunction with larger diameter pipes, such as between twelve inches and fifty-four inches. The structure of the present invention provides for a thin, strip-like, sheet material, annular base, which is to be located about the pipe directly adjacent the weld area but longitudinally spaced therefrom. The annular base is to be completely enclosed about the pipe by a latching assembly. The annular base defines the diameter which is larger than the pipe so as to form an annular space between the pipe and the base. Within the annular base there are located a plurality of spaced-apart foot pad assemblies. Each foot pad assembly includes two in number of contact pads. With the annular base installed in position about the pipe, each contact pad is slightly depressed creating a spring-biased holding force which positively secures the base and the pipe together. A spring assembly is connected to each contact pad. Each spring assembly is adjustable to increase or decrease the spring force between the annular base and the pipe. This adjustment is for the purpose of insuring that the annular base is rigidly installed in position on each and every pipe regardless of variations in pipe diameter. Exteriorly located on the annular base is a track to be engaged by the welding head apparatus. The welding head apparatus is to be moved about the pipe using the track.

The principal objective of the present invention is to provide an improved track assembly for disposition about a pipe having adjustable spring-biased means at its inward side to accommodate a limited amount of variation in diameters of pipes.

Another objective of the present invention is to provide within the track assembly an uninterrupted drive surface for the welding head so that the welding head will be continuously and smoothly moved on the track assembly at a steady rate of movement.

DETAILED DESCRIPTION OF THE SHOWN EMBODIMENT

Figure 1:
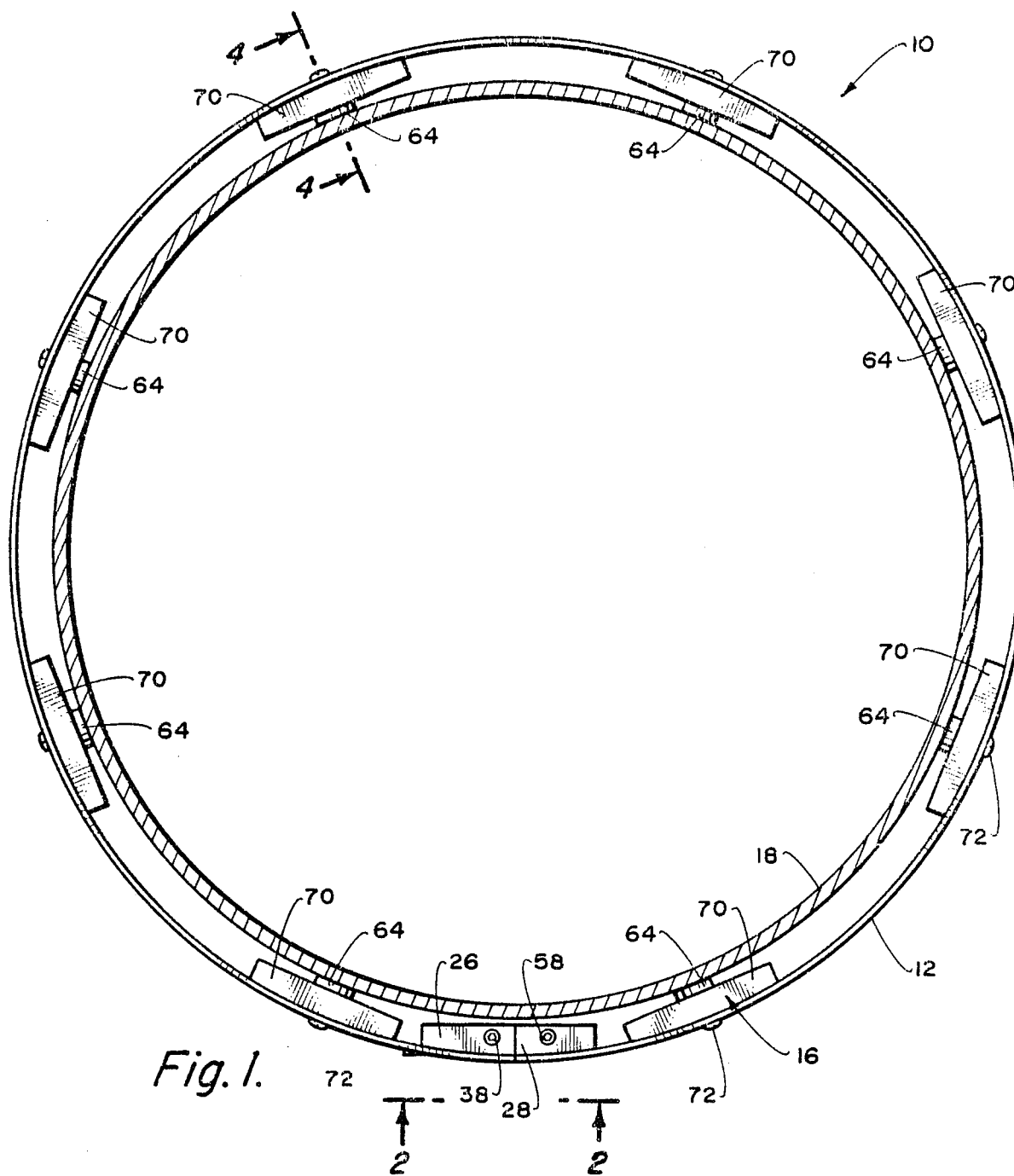
FIG. 1 is a cross-sectional view through a pipe on which the track assembly of the present invention has been mounted.
Figure 2:
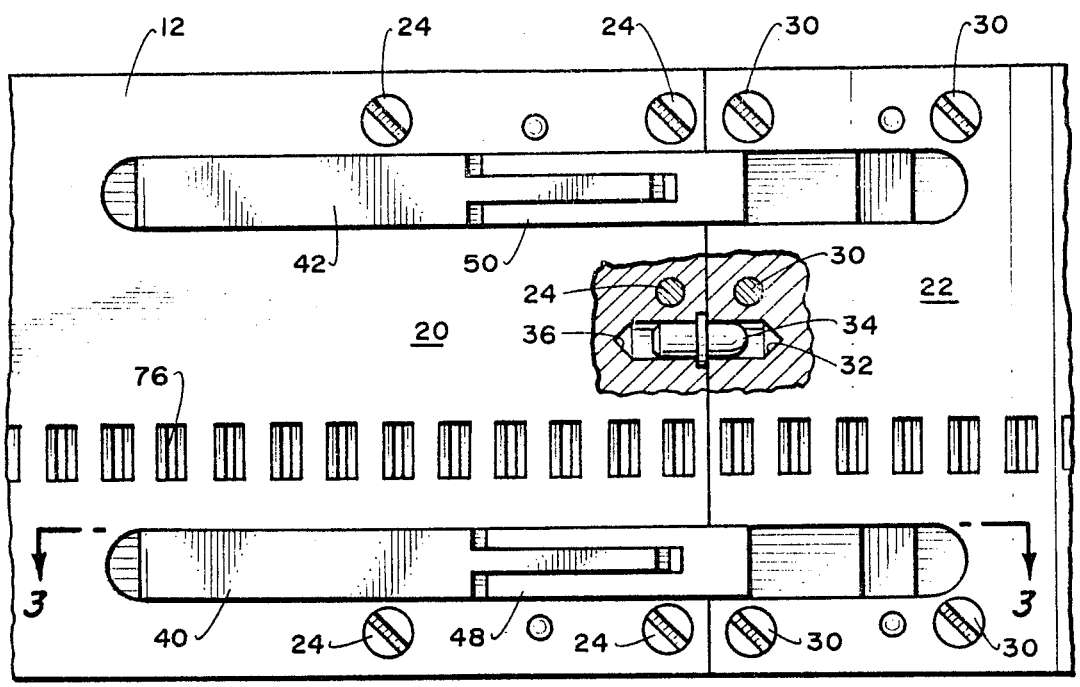
FIG. 2 is a bottom plan elevational view of a portion of the track assembly of the present invention taken along line 2—2 of FIG. 1 showing more clearly the latching assembly utilized within the track assembly with the latching assembly being located in the closed or latched position.

Referring particularly to the drawings, there is shown the track assembly 10 of the present invention which is composed generally of a base 12 and a plurality of spaced-apart foot pad assemblies 16. The base 12 is formed of substantially rigid sheet material, but is somewhat flexible. The base 12 is formed of a strip usually about 4 to 6 inches wide. The length of the base 12 is selected to be somewhat greater than the circumference of the pipe 18. The pipe 18 is constructed of metal and it is the function to weld a section of pipe (not shown) to the pipe 18. The welding is to be completed by a welding head assembly which is also not shown. The particular diameter as previously mentioned for the pipe 18 would be between 12 and 54 inches or greater.

The base 12 terminates at ends 20 and 22. Fixedly mounted by fasteners 24 to the interior surface of the end 20 is a block 26. A similar block 28 is mounted on the interior surface of the end 22 by fasteners 30. Block 28 includes an alignment pin opening 32. An alignment pin 34 is fixedly mounted within hole 36 of block 26. A portion of pin 34 extends within opening 32 to correctly position ends 20 and 22 as well as blocks 26 and 28 in an abutting relationship prior to being held together by a latching assembly now to be described.

Pivotally mounted onto the block 26 by means of pivot pin 38 is a handle 40. A similar handle 42 is pivotally mounted by a pin (not shown) to the block 26. Pivotally mounted onto the handle 40 by means of pin 46 is a hook 48. A similar hook 50 is pivotally mounted by a pin (not shown) to the handle 42. The hook 48 includes a recess 54 and a hook recess 56. Hook 50 includes a recess (not shown) similar to recess 54 and also a hook recess (not shown) similar to hook recess 56. Hook recess 56 is connectable with a pin 58 which is mounted within the block 28. A similar pin (not shown) is to be engageable by the hook recess (not shown) which is formed within the hook 50.

Base 12 can be bent around the circumference of the pipe 18 with pin 34 being located within the opening 32. The operator then locates the hook recess 56 about the pin 58. A similar hook recess of the hook 50 is located about the pin 60. The operator then moves the handles 40 and 42 from the phantom line position shown in FIG. 3 of the drawings to the solid line position until pin 38 is located within the recess 54 with also the similar pin being located within the similar recess of the hook 50. As a result, the hooks 48 and 50 have caused the ends 20 and 22 to be pulled tightly together and held in that position. Because the handles 40 and 42 have been moved over-center, accidental unlatching of the handles 40 and 42 is prevented. This over-center movement is readily apparent in observing that the line of force 62 is located exteriorly of the pin 58 within FIG. 3 of the drawings. With the handles 40 and 42 in the phantom line position of FIG. 3, it can be seen that the line of force 62 is located completely on the other side of the pin 58.

Figure 3:
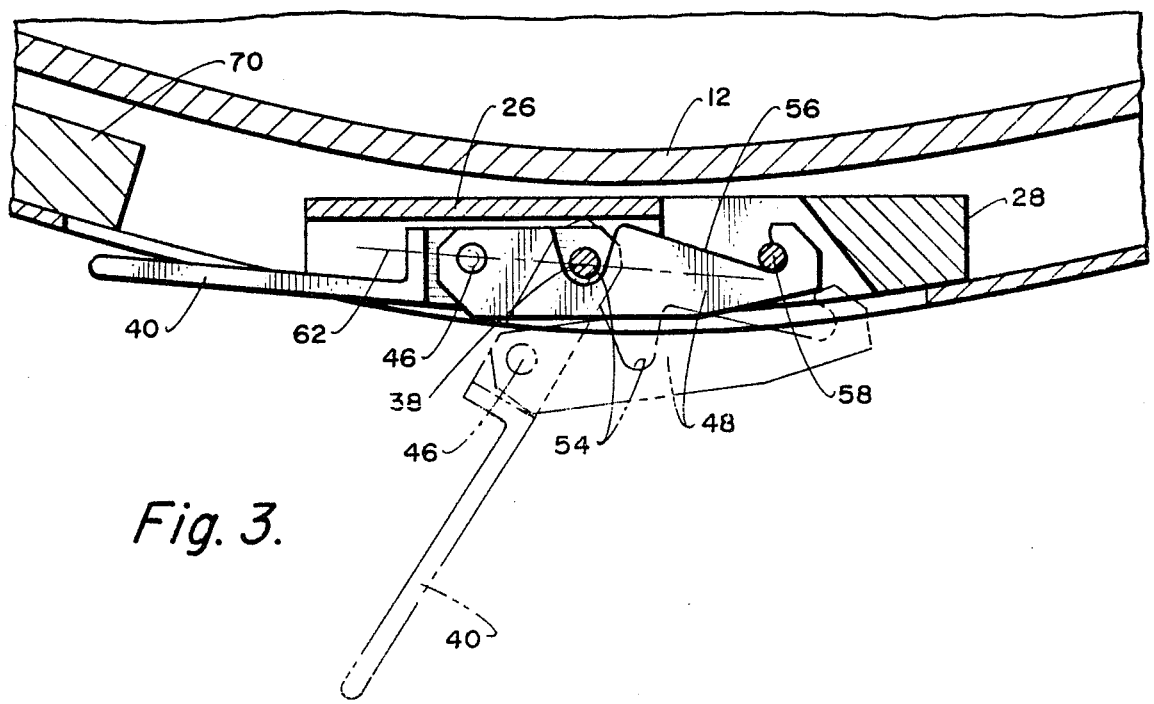
FIG. 3 is a cross-sectional view through a portion of the latching assembly taken along line 3—3 of FIG. 2.

Because blocks 26 and 28 are located between the interior surface of annular base 12 and the exterior surface of pipe 18, when handles 40 and 42 are in the latched position, the exterior surface of the handles 40 and 42 are substantially flush with the exterior surface of base 12 (as shown in FIG. 3) positioning the latching assembly to not physically interfere with the movement of the welding head about base 12.

With the latching assembly in the latched position (solid line position), each of the contact pads 64 of each foot pad assembly 16 is slightly compressed against the action of its respective Belleville spring assembly 66.

It is to be noted that there are two in number of contact pads 64 associated with each separate foot pad assembly 16. Each foot pad assembly 16 is evenly spaced apart from the directly adjacent other foot pad assemblies. It is to be noted that there are eight in number of foot pad assemblies 16 shown in the drawings. However, it is understood that this number can be readily increased or decreased.

Each Belleville spring assembly 66 is shown located within a recess 68 formed within foot pad housing 70. Foot pad housing 70 is attached to the interior surface of the base 12 by means of conventional fasteners 72. Each contact pad 64 is inwardly attached to a pin 74 which passes through its respective Belleville spring assembly 66. It is the function of the contact pad 64 in conjunction with its respective spring assembly 66 to exert a continuous biasing force between the base 12 in the pipe 18 to fix in position the base 12 relative to the pipe 18.

Also, pipes tend to vary (up to five percent) in diameter. It is important that the ends 20 and 22 are physically maintained tightly abutting in order to form a continuous uninterrupted surface. This variance of the pipe diameter is partly compensated for by the biasing action of the foot pad assemblies 16 to achieve this continuous uninterrupted surface.

To insure that the base 12 is rigidly mounted on the pipe 18 regardless of the variance of pipe diameter, the biasing force of each of the contact pads 64 is capable of being adjusted. This adjustment is achieved through the use of a sleeve 60 which has an internal hole 44. The pin 74 is slidably mounted in a close fitting manner within the hole 44. The inner end of the sleeve 60 is formed into an enlarged annular flange 14. The Belleville spring assembly 66 is to abut against the flange 14. The outer end of the sleeve 60 has an exteriorly threaded surface 71. This exteriorly threaded surface 71 is threadably mounted with internal screw thread 73 formed within a nut 75. The nut 75 is fixedly mounted to the annular base 12.

Figure 4:
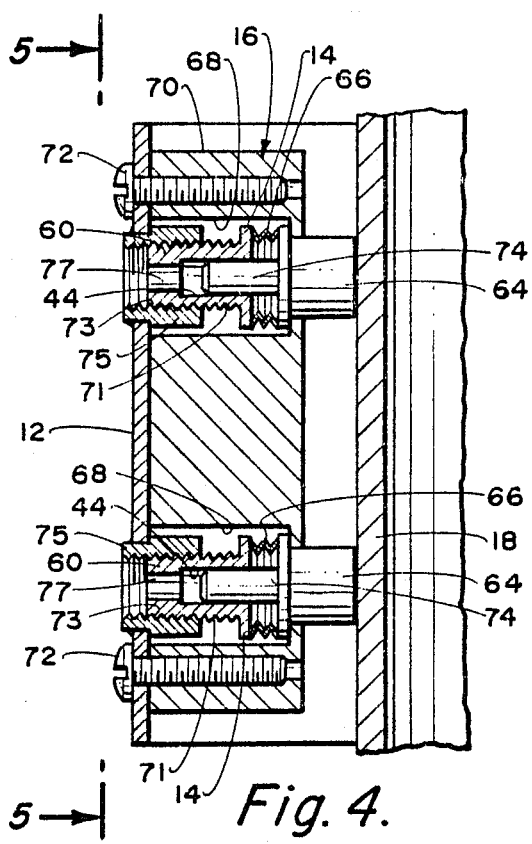
FIG. 4 is a cross-sectional view through one of the foot pad assemblies included within the track assembly of this invention taken along line 4—4 of FIG. 1 showing the foot pad assembly adjusted to an extended position.
Figure 6:
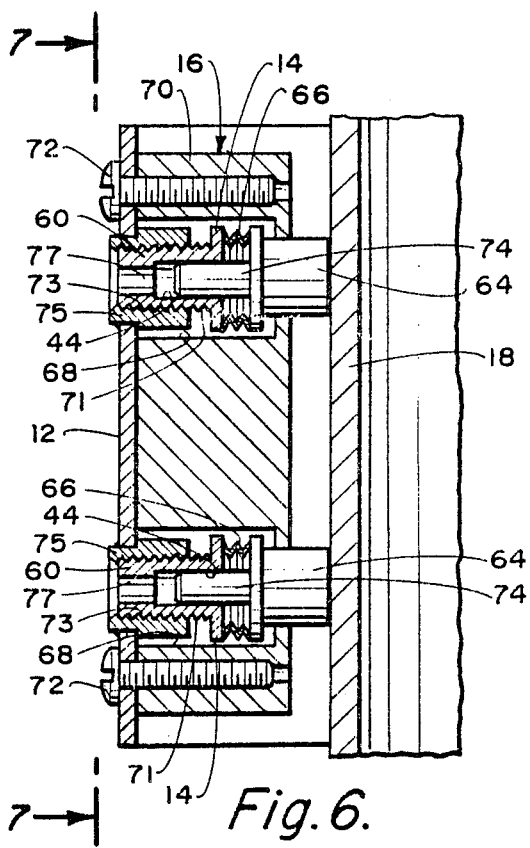
FIG. 6 is a view similar to FIG. 4 but showing the foot pad assemblies in the retracted position.
Figure 5:
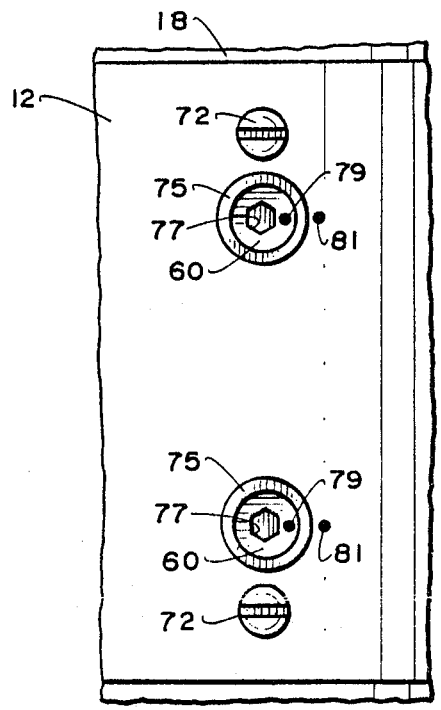
FIG. 5 is an end view of the foot pad assembly taken along line 5—5 of FIG. 4 showing the position of an indexing arrangement incorporated with the foot pad assembly with this indexing arrangement being in the position representing the extended position of the foot pad assembly.
Figure 7:
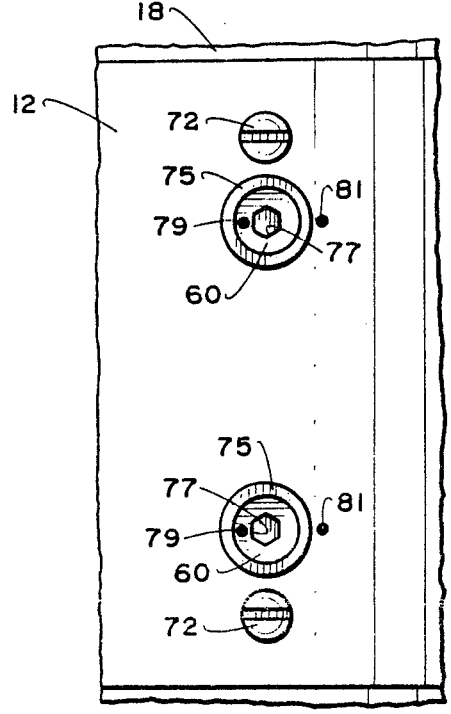
FIG. 7 is a view similar to FIG. 5 but showing the indexing arrangement in the position corresponding to the retracted position of FIG. 6, with FIG. 7 being taken along line 7—7 of FIG. 6.

Centrally mounted within the outer end of the sleeve 60 and in alignment with the hole 44 is an Allen wrench opening 77. An Allen wrench tool is to be engageable with the Allen wrench openings 77 to effect rotation of the sleeve 60 relative to the nut 75. Clockwise rotation (as shown in FIGS. 5 and 7) of the sleeve 60 will cause the spring assembly 66 to compress and move the contact pad 64 to the extended position shown in FIG. 4. Counterclockwise rotation of the sleeve 60 will cause the contact pad 64 to move to the retracted position as shown in FIG. 6. Generally, when the track assembly 10 of the present invention is moved from one pipe 18 to another pipe 18, the sleeve 60 of each foot pad assembly 16 will be evenly tightened (or loosened) to compensate for the variance in diameter from going from the one pipe 18 to the other pipe 18. This even amount of movement of the contact pads 64 is so that the annular base 12 will be precisely circumferentially located relative to the pipe 18. This even amount of rotational movement of each of the sleeves 60 is to be generally accomplished by a trial and error based on how loosely the annular base is on the pipe 18 or as to how tight the annular base 12 is on the pipe 18. To assist the operator in making this trial and error determination there is located an indexing mark 79 on the exterior surface of each of the sleeves 60. Also located on the exterior surface of the annular base 12 directly adjacent each of the nuts 75 is an indexing mark 81. By the operator observing the position of each of the indexing marks 79 to their respective indexing marks 81, the operator is assisted in orienting each of the sleeves 60 within their respective nut 75. In other words, for each installation on a pipe 18, each sleeve 60 is to be at a correspondingly same position within its threaded opening 73 of each of the nuts 75.

To move the welding head (not shown) on annular base 12, there is incorporated identical gear teeth openings 76 along the entire length of the annular base 12. The gear teeth openings 76 are evenly spaced-apart. The openings 76 are to be engageable by the teeth of a gear (not shown) which is part of the welding head assembly.

What is claimed is:

1. In combination with a pipe, a track assembly for mounting a welding head assembly on said pipe for the purpose of welding said pipe, said track assembly comprising:

an annular base locatable about said pipe, said annular base being sufficiently flexible to facilitate bending of said annular base about said pipe during installing of such on said pipe;

track means exteriorly mounted on said annular base, said track means to connect with said welding head assembly, said track means comprising a series of gear teeth openings formed within said annular base;

a foot pad assembly interiorly mounted on said base, said foot pad assembly being in contact with said pipe, said foot pad assembly including spring-biasing means being continuously spring-biased in contact with said pipe for tightly holding said track means onto said pipe, said spring-biasing means including adjustment means, said adjustment means being movable to vary the amount of spring force applied to said pipe by said spring-biasing means;

said annular base terminating at ends, a latching assembly attached to said annular base at said ends, said latching assembly for securing together said ends in an abutting relationship to achieve a continuous uninterrupted exterior surface of said annular base, said foot pad assembly includes a plurality of foot pad housings, each said foot pad housing having at least one contact pad, said adjustment means comprises a sleeve threadably mounted within a threaded opening formed within said housing, said contact pad being connected to said sleeve, said spring-biasing means includes a spring assembly, said spring assembly being located between said contact pad and said sleeve, rotational movement of said sleeve relative to said housing varies the spring force of said spring assembly, said rotational movement to occur by a tool engaging with a wrench opening, said wrench opening formed within said sleeve, said wrench opening located between said annular base and said pipe to thereby space said foot pad assembly from the path of the welding head assembly to not interfere with normal operation of the welding head assembly as it moves about said annular base; and indexing means mounted on each said foot pad housing and each said sleeve, said indexing means to be observable to ascertain the approximate amount of spring force being applied between said track assembly and said pipe, said indexing means to be setable at the same position for each said foot pad housing thereby precisely concentrically locating said annular base relative to said pipe.

2. The combination as defined in claim 1 wherein: said spring assembly comprising a Belleville spring.

3. The combination as defined in claim 2 wherein: said latching assembly including a manually operated over-center latching mechanism.

4. The combination as defined in claim 3 wherein: each said foot pad assembly including at least two contact pads, each said contact pad being connected to a separate said spring assembly.

5. The combination as defined in claim 4 wherein: said latching assembly being substantially located between said annular base and said pipe thereby also spacing said latching assembly from the path of the welding head assembly to not interfere with normal operation of the welding head assembly as it moves about said annular base.

* * * * *